UNITED STATES PATENT OFFICE 1,999,069

POLYNUCLEAR AROMATIC AMINO-BASES, AND PROCESS OF MAKING SAME

Theodor Sutter, Basel, Switzerland, assignor to firm Society of Chemical Industry in Basle, Basel, Switzerland No Drawing. Application January 23, 1933, Serial No. 653,216. In Switzerland February 3, 1932

10 Claims. (Cl. 260—130)

The present invention relates to polynuclear aromatic bases. It comprises the process for the manufacture of these compounds, the new compounds themselves, and their application in the industry.

It is known that by the reaction of 1 mol. anhydroformaldehydeaniline with 2 mol. anilinehydrochloride in the presence of 5 mol. aniline at a temperature below 20° C., para-aminobenzylaniline of the formula

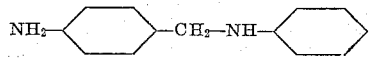

is obtained (see German Patent No. 87,934). The product is thus built up from 0.5 mol. aldehyde and 1 mol. amine.

I have now found that, by interacting anhydroformaldehydeaniline and other condensation products derived from aromatic amines and formaldehyde and containing active methylene groups, such as for instance anhydro-p-aminobenzylalcohol and its polymers, methyleneaniline and so on, with primary aromatic amines having a free para-position under modified conditions, for instance by using not substantially more than one mol. of primary aromatic amine for each mol. of methylene compound or by adapting the temperature employed to the quantity and strength of the acid employed, aromatic amino-bases of high molecular weight are obtained, further molecules of the methylene compound obviously attaching themselves to the intermediately formed aminobenzylaniline. Advantageously, the reaction may be started with about equimolecular proportions of Schiff's base and primary amine and then, by introducing further quantities of the methylene base, the desired proportion of aldehyde to amine may be obtained. As catalytically acting acids, either organic or mineral acids may be used, such as hydrochloric acid, sulfuric acid, formic acid, acetic acid, salicyclic acid and the like. In the case of strong acids, as for instance hydrochloric acid, a few units per cent. may suffice, while for instance acetic acid may be used even in excess of an equimolecular proportion with respect to the amine without damage. A part of the primary amine used generally remains unattacked and can easily be steam-distilled after the reaction mixture has been neutralized. If the temperature of condensation of anhydroformaldehydeaniline with a little aniline and acid is carried to over 120° C., there are produced resins of the type of body described in German Patent No. 335,984, which are not herein claimed.

Products similar to those obtained from previously formed anhydroformaldehydeaniline are produced when, at a suitable temperature, formaldehyde is gradually added to a primary amine mixed with a small percentage of hydrochloric acid, so that the primarily formed Schiff's base is converted progressively into the binuclear- and further into the polynuclear-base, provided that the total aldehyde introduced does not attain one equivalent of the amine; preferably about ¾ mol. aldehyde is used. In general, the temperature should not exceed 100° C.; by prolonging the period of reaction one may work at essentially lower temperatures.

The lively exothermic reaction is advantageously carried out in a solvent. Particularly suitable are organic solvents, such as alcohol or cyclohexanone. Still, under certain conditions, it is also possible to operate in aqueous solution.

It is known that by the action of a molecular proportion of formaldehyde on aniline hydrochloride in aqueous solution, fusible resins are produced which dissolve in many solvents of high boiling point but not in alcohol or benzene. This condensation occurs even at low temperature and is complete at 40°–50° C. in a few minutes. If, under the same conditions, less than 1 mol. of aldehyde is brought into reaction, there remains a part of the aniline unchanged and there is obtained in correspondingly smaller quantity the same fusible resin as in the case with the use of equimolecular proportions.

According to the present invention, the excess of aniline, with the exception of traces, is condensed and new products, which are thick oils or even solid, resembling those obtained from anhydroformaldehydeaniline, are produced when the condensation solution is heated to 70–80° C., or when it is allowed to remain undisturbed for a long time or, finally, when the reaction is conducted from the beginning at a raised temperature. The same result is achieved when equimolecular proportions of aldehyde and amine are condensed in presence of acid to yield anhydro-p-amidobenzylalcohol and then treated with less than 1 mol. preferably with 0.1–0.4 mol. aniline conveniently in form of its salts.

The new products vary from thick liquids to solids when cold and from oily to viscid liquids when hot; they are generally freely soluble in the usual solvents, particularly mixtures of alcohol and benzene, and also in dilute acids.

The more the methylene content approaches the molecular proportion of 1:1 of methylene:amine, the more pronounced is the resinous character of the oil.

The new bases are applicable for many uses in the arts, for instance as an addition to pickling solutions, further in the rubber industry and as parent materials for the production of artificial resins and the like.

Instead of aniline and Schiff's bases produced from aniline, homologues thereof may be used, such as ortho- or meta-toluidine, α-naphthylamine, anhydroformaldehyde-ortho- or meta-toluidine.

The following examples illustrate the invention, the parts being by weight:—

*Example 1*

Into 1023 parts of aniline (11 mol.) at 60° C. there are rapidly introduced 410 parts of formaldehyde of 40 per cent. strength (5 mol.). The mixture becomes spontaneously heated to 70° C. and the water produced by the reaction separates and is removed by means of a separating funnel. The anhydroformaldehydeaniline thus produced remains dissolved and separates only after long standing, so that it is advantageous to work up the solution directly. While vigorously stirring, there are added 50 parts of concentrated hydrochloric acid, whereupon there is a considerable increase of temperature which, by cooling, must be lowered to or kept at 70° C. After an hour, the acid is neutralized by means of 500 parts of N-sodium carbonate solution and the excess of aniline is steam-distilled. There remains a thick oil which becomes solid on cooling, without crystallization. The molecular proportion of methylene to aniline is 0.63:1.

If, in this example, before the addition of hydrochloric acid the mass is diluted with 500 parts of alcohol, it will be considerably easier to control the temperature.

*Example 2*

160 parts of ortho-toluidine (1½ mol.) are dissolved in 80 parts of glacial acetic acid and 160 parts of anhydroformaldehydeaniline (1½ mol.), which for the purpose of being more easily wetted should be ground with 40 parts of alcohol, are introduced in the cold. Dissolution is promoted by the addition of 50 parts of glacial acetic acid. After standing overnight, the mass is neutralized with sodium carbonate and the excess of toluidine is steam-distilled. The residue is a brownish, viscid mass, which becomes a thin fluid when heated. It is freely soluble in a mixture of alcohol and benzene and contains 0.78 mol. methylene to one mol. base.

*Example 3*

279 parts of aniline (3 mol.) and 10 parts of concentrated hydrochloric acid are heated together at 40° C. and there are added, while continuously stirring and not too quickly, 164 parts of formaldehyde of 40 per cent. strength (2 mol.). The temperature rises to 70° C. and is kept at that point for an hour. The mass is neutralized with sodium carbonate and the aniline in excess is steam distilled. There is left a viscid oil which becomes solid on cooling and contains 0.85 mol. methylene to 1 mol. aniline. It behaves like the product of Example 1.

*Example 4*

650 parts of aniline hydrochloride (5 mol.) are dissolved in 2000 parts of water and there are added rapidly at 40° C. 328 parts of formaldehyde of 40 per cent. strength (4 mol.). The temperature rises to about 60° C. and is then heated to 80° C., at which temperature it is kept for about an hour. The acid is then neutralized by means of sodium carbonate and the mass is steam distilled. The latter treatment may be omitted as only extremely small quantities of unchanged aniline are present. There is obtained a mass which is oily when hot and resinous when cold, and is hardly distinguishable from the products of Examples 1 and 3 in respect of solubility, appearance and reaction. The proportion of methylene to aniline is 0.82:1.

*Example 5*

260 parts of aniline hydrochloride (2 mol.) are dissolved in 800 parts of water and the solution is mixed at 40° C. with 110 parts of formaldehyde of 40 per cent. strength (1.34 mol.). After standing for 3 days a small precipitate is filtered and the filtrate is worked up as described in Example 4. The product obtained is softer and more soluble than that obtained as described in Example 4. Its methylene content is 0.6 mol. to 1 mol. aniline.

*Example 6*

260 parts of aniline hydrochloride are dissolved in 1500 parts of water and the solution is mixed at 35° C. with 164 parts (2 mol.) formaldehyde of 40 per cent. strength. The temperature rises to 50° C. After ¼ hour an aqueous solution of 78 parts (0.6 mol.) of aniline hydrochloride is added and the solution is heated for 3 hours on a water-bath, whereupon it is further worked up as described in Examples 4 and 5. There is obtained a resin which is quite similar to the products described above.

*Example 7*

143 parts of α-naphthylamine (1 mol.) are rubbed up with 1 mol. of concentrated hydrochloric acid and suspended in 500 parts of alcohol. There are now added 140 parts of anhydroformaldehydeaniline (1.3 mol.) and the mixture is heated for a long time. After neutralization of the acid by means of sodium carbonate and steam distillation of the alcohol, the new base remains in the form of a brittle resin of low melting point.

What I claim is:—

1. A process of manufacturing polynuclear aromatic amino-compounds, the single aromatic amine groups of which are linked together by methylene groups in such a manner that the molecular proportion of the methylene groups to the aromatic amine groups is higher than 0.5:1 and lower than 1:1 which comprises reacting a primary aromatic amine having a free para-position and an aromatic amine compound containing an active methylene group at a temperature below 120° C. in the presence of an acid, the molecular proportion of the primary amine to the methylene compound being not substantially higher than 1:1.

2. A process of manufacturing polynuclear aromatic amino-compounds, the single aromatic amine groups of which are linked together by methylene groups in such a manner that the molecular proportion of the methylene groups to the aromatic amine groups is higher than 0.5:1 and lower than 1:1 which comprises reacting a primary aromatic amine having a free para-position and a methylene compound of the type of anhydroformaldehydeaniline at a temperature below 120° C. in the presence of an acid, the molecular proportion of the primary amine to the methylene compound being not substantially higher than 1:1.

3. A process of manufacturing polynuclear aromatic amino-compounds, the single aromatic amine groups of which are linked together by methylene groups in such a manner that the molecular proportion of the methylene groups to the aromatic amine groups is higher than 0.5:1 and lower than 1:1 which comprises reacting a primary aromatic amine having a free para-position and a methylene compound of the type of anhydro-para-amidobenzylalcohol and its polymers at a temperature below 120° C. in the presence of an acid, the molecular proportion of the primary amine to the methylene compound being not substantially higher than 1:1.

4. A process of manufacturing polynuclear aromatic amino-compounds, the single aromatic amine groups of which are linked together by methylene groups in such a manner that the molecular proportion of the methylene groups to the aromatic amine groups is higher than 0.5:1 and lower than 1:1 which comprises reacting a primary aromatic amine having a free para-position and an aromatic amine compound containing an active methylene group at a temperature below 120° C. in the presence of a solvent and of an acid, the molecular proportion of the primary amine to the methylene compound being not substantially higher than 1:1.

5. A process of manufacturing polynuclear aromatic amino-compounds, the single aromatic amine groups of which are linked together by methylene groups in such a manner that the molecular proportion of the methylene groups to the aromatic amine groups is higher than 0.5:1 and lower than 1:1 which comprises reacting a primary aromatic amine having a free para-position and a methylene compound of the type of anhydroformaldehydeaniline at a temperature below 120° C. in the presence of a solvent and of an acid, the molecular proportion of the primary amine to the methylene compound being not substantially higher than 1:1.

6. A process of manufacturing polynuclear aromatic amino-compounds, the single aromatic amine groups of which are linked together by methylene groups in such a manner that the molecular proportion of the methylene groups to the aromatic amine groups is higher than 0.5:1 and lower than 1:1 which comprises reacting a primary aromatic amine having a free para-position and a methylene compound of the type of anhydro-para-amidobenzylalcohol and its polymers at a temperature below 120° C. in the presence of a solvent and of an acid, the molecular proportion of the primary amine to the methylene compound being not substantially higher than 1:1.

7. A process of manufacturing polynuclear aromatic amino-compounds, the single aromatic amine groups of which are linked together by methylene groups in such a manner that the molecular proportion of the methylene groups to the aromatic amine groups is higher than 0.5:1 and lower than 1:1 which comprises reacting aniline and an aniline compound containing active methylene groups at a temperature below 120° C. in the presence of an acid, the molecular proportion of the aniline to the methylene compound being not substantially higher than 1:1.

8. A process of manufacturing polynuclear aromatic amino-compounds, the single aromatic amine groups of which are linked together by methylene groups in such a manner that the molecular proportion of the methylene groups to the aromatic amine groups is higher than 0.5:1 and lower than 1:1 which comprises reacting aniline and an aniline compound containing active methylene groups in the presence of a solvent and of an acid at a temperature below 120° C., the molecular proportion of the aniline to the methylene compound being not substantially higher than 1:1.

9. As new products, polynuclear aromatic amino bases, the single aromatic amine radicles of which are linked together by methylene groups in such a manner that the molecular proportion of the methylene groups to the aromatic amine groups is higher than 0.5:1 and lower than 1:1 the new bases being thick liquids to solids when cold and oily to viscid when hot and being generally freely soluble in the usual organic solvents and also in dilute acids.

10. As new products, polynuclear aromatic amino bases derived from aniline and formaldehyde, the single aniline radicles of which are linked together by methylene groups in such a manner that the molecular proportion of the methylene groups to the aniline groups is higher than 0.5:1 and lower than 1:1, the new bases being thick liquids to solids when cold and oily to viscid when hot and being generally freely soluble in the usual organic solvents and also in dilute acids.

THEODOR SUTTER.